United States Patent [19]

Bergman et al.

[11] Patent Number: 4,524,360

[45] Date of Patent: Jun. 18, 1985

[54] PULSE RADAR APPARATUS

[75] Inventors: Jan Bergman; Pieter Van Genderen, both of Haaksbergen; Willem A. Hol, Hengelo, all of Netherlands

[73] Assignee: Hollandse Signaalapparaten B.V., Hengelo, Netherlands

[21] Appl. No.: 344,917

[22] Filed: Feb. 2, 1982

[30] Foreign Application Priority Data

Feb. 9, 1981 [NL] Netherlands ............. 8100606

[51] Int. Cl.³ .................. G01S 13/20; G01S 7/28
[52] U.S. Cl. ................. 343/17.1 R; 343/5 DP; 343/5 FT
[58] Field of Search ........... 343/5 FT, 5 DP, 5 VQ, 343/17.1 R

[56] References Cited

U.S. PATENT DOCUMENTS

| | | | |
|---|---|---|---|
| 3,441,930 | 4/1969 | D'Obrenan et al. | 343/7.7 |
| 3,480,953 | 11/1969 | Shreve | 343/7.7 |
| 3,610,901 | 10/1971 | Lynch | 343/17.1 R X |
| 3,618,088 | 11/1971 | Simpson, Sr. | 343/7.7 |
| 3,765,017 | 10/1973 | Dentino | 343/7.7 |
| 3,828,348 | 8/1974 | Murray, Jr. | 343/7.7 X |
| 4,106,019 | 8/1978 | Alexander et al. | 343/9 |
| 4,119,966 | 10/1978 | Bouvier et al. | 343/7.7 |
| 4,214,242 | 7/1980 | Colin | 343/7.7 |
| 4,234,880 | 11/1980 | Klemm | 343/5 FT |

OTHER PUBLICATIONS

J. D. Grimm et al., "Radar Signal Processing Techniques" May '78, pp. 1-11, IEEE Electro/78 Conf. Record, 28/2, presented at Electro/78, Boston (U.S.A.).

Primary Examiner—T. H. Tubbesing
Assistant Examiner—Gilberto Barrón, Jr.
Attorney, Agent, or Firm—Robert J. Kraus

[57] ABSTRACT

In a pulse radar apparatus target returns are detected, sampled, digitized per range quant and frequency analyzed. The apparatus includes a cell classification unit (5) for deriving from the spectrum range of the target returns a cell classification signal, whose logical values indicate that the target returns within a radar cell are classified, in the first instance, as first trip and multiple trip signals. In a microprocessor (12) the cells, which collectively cover one single target, are combined to form a cluster, while a signal representative of the target covered by the cluster is determined. Furthermore in the microprocessor (12) a cluster classification signal is derived, whose logical values indicate that the target returns within the cluster are classified as first trip and multiple trip signals. The signal representative of the target covered by the cluster is read out if it is derived from target returns classified as first trip echoes.

3 Claims, 4 Drawing Figures

PULSE RADAR APPARATUS

BACKGROUND OF THE INVENTION

The invention relates to a pulse radar apparatus comprising a transmitter and receiver, whereby the target returns—after detection—are sampled and digitised per range quant, an n-point FFT processing unit, and a threshold circuit for determining a threshold value for each of the n frequency output channels of the FFT processing unit, above which threshold value the output signals of the FFT processing unit are passed.

The FFT processing unit converts the video data, sampled and digitised per range quant, from n successive radar scans into n output signals situated in adjoining frequency bands. Such a conversion is hereinafter referred to as an FFT scan. A division of the radar range into radar cells formed by range quants and azimuth sectors determined by n successive azimuth scans then corresponds with a division into FFT cells formed by FFT scans and range quants. For the successive FFT scans the corresponding azimuth sectors may overlap each other partly; hence, in such a case the radar cells of these azimuth sectors will also overlap each other. The output signals of the FFT processing unit determine the spectrum of the target returns processed per radar cell.

With the use of a magnetron in the transmitter of the pulse radar apparatus the first trip echoes can be detected coherently, unlike the multiple trip echoes. The spectrum of the first trip echoes will therefore differ from that of the multiple trip echoes. With the radar beam moving over the target, the spectra of the coherent target returns, falling within successive radar cells in a range bin, differ mutually in the sense that the spectrum range is a minimum at the instant the beam is directed at the target centre and increases as the beam is directed away from the centre. In case the target has not yet reached the centre of the beam or has already passed that centre, the spectrum range of a coherent first trip echo may sometimes be greater than the spectrum range of multiple trip echoes, so that the coherent first trip echo may be classified as a multiple trip echo and be suppressed. If the range quants are smaller than the length of the target returns, several successive digitised samples will be from such returns. Because of the random noise present, the spectrum of samples taken at the centre of the target returns will generally be smaller than that of samples taken from the front or rear part of the target returns; in the latter case, a first trip echo, indeed in more extreme circumstances, can still be classified as a multiple trip echo and be suppressed.

SUMMARY OF THE INVENTION

The present invention has for its object to provide a pulse radar apparatus, as set forth in the opening paragraph, such that on account of a spectrum analysis performed in the FFT processing unit a proper distinction between first trip and multiple trip echoes can be made.

According to the invention, a cell classification unit, connected to the threshold circuit, is provided for deriving from the spectrum range of the target returns processed per radar cell a cell classification signal (CLASS), whose logical values indicate that the target returns within such a cell are, in the first instance, classified as first trip and multiple trip signals. A microprocessor, which is also provided, comprises means for combining the cells, which collectively cover one single target, to form a cluster and for determining a signal representative of the target covered by the cluster, means for deriving, from the cell classification signals of the cluster cells, a cluster classification signal (CLUC) whose logical values indicate that the target returns within the cluster are classified as first trip and multiple trip signals, and means for reading said signal representative of the target covered by the cluster out of the microprocessor with the use of the cluster classification signal, in so far as the read-out signal is derived from target returns classified as first trip echoes.

Therefore, from the spectrum defined for one cell a preliminary indication of first trip/multiple trip echoes is obtained, while through an averaging process of the preliminary indications over the cells of a cluster a final decision on first trip/multiple trip echoes can be made.

BRIEF DESCRIPTION OF THE DRAWING

The invention will now be described with reference to the accompanying drawing, of which.

DESCRIPTION OF THE PREFERRED EMBODIMENT

Figure 1:
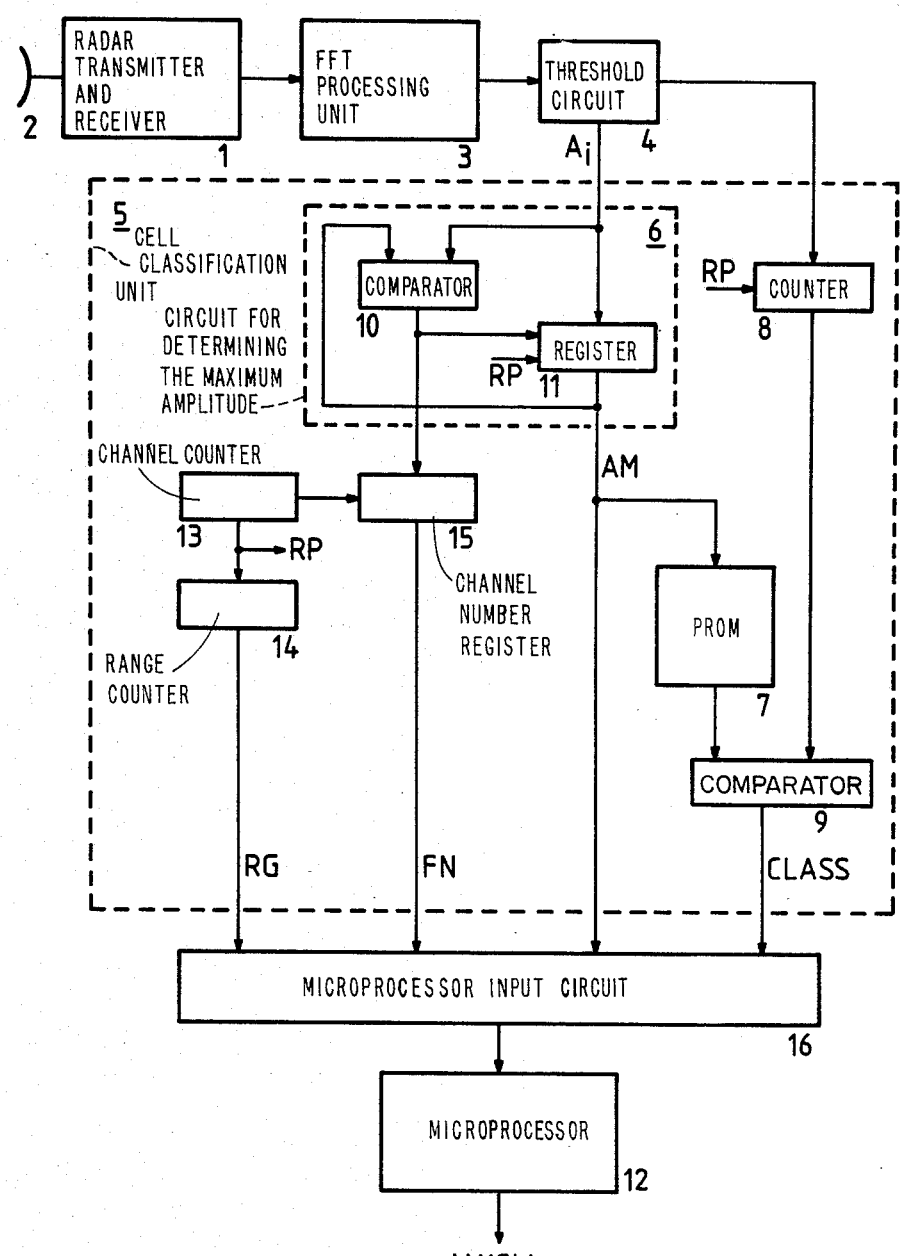
FIG. 1 is a block diagram of the pulse radar apparatus according to the invention.

The pulse radar apparatus of FIG. 1 comprises a pulse radar transmitter and receiver 1, an antenna 2, an FFT processing unit 3, and a threshold circuit 4. The transmitter of the pulse radar apparatus is provided with a magnetron, permitting a coherent detection of first trip echoes, but no coherent detection of multiple trip echoes. In the receiver of the pulse radar apparatus the target returns are, after detection, sampled and digitised per range quant. The digitised video signals thus obtained are passed first through a digital MTI canceller, forming part of the transmitter and receiver 1, to eliminate the signals from stationary targets, and then to the FFT processing unit 3. The FFT processing unit 3 converts the video data, supplied from n successive radar scans and situated in one range bin, into n output signals in the n frequency output channels of the FFT processing unit. If the video data of the radar scans 1, 2, ..., n for all appropriate range quants is converted into frequency data, the video data from radar scan $n-k+1$, $n-k+2, \ldots, 2n-k$ for all appropriate range quants is converted into frequency data. Here k may assume the values $0, 1, 2, \ldots, n-1$. The successive FFT scans thus correspond with adjoining or more or less overlapping azimuth sectors. With each FFT scan and each range quant the FFT processing unit 3 supplies the threshold circuit 4 with n digital words, namely the amplitudes of n frequency values from the video spectrum. For each of these frequency values, i.e. for each of the frequency output channels of the FFT processing unit, a threshold is established. The frequency values exceeding this threshold are passed. In general the threshold for the centre frequency output channels will be greater than that for the extreme frequency channels; this is mainly due to the canceller effect in the pulse radar transmitter and receiver 1.

The signals of amplitudes $A_i$ ($i=0, 1, 2, \ldots, n-1$) exceeding the relevant threshold are supplied to a cell classification unit 5 to derive, from the spectrum range of the target returns processed per radar cell, a cell classification signal (CLASS), whose logical values indicate that the target returns within such a cell are classified in the first instance as first trip and multiple trip signals. The cell classification unit 5 comprises: a circuit 6 for determining the maximum amplitude AM of frequency output signals $A_i$ which output signals exceed the threshold values established for the relevant frequency output channels and which output signals are supplied per radar cell by the FFT processing unit; a preprogrammed memory (PROM) 7; a counter 8; and a comparator 9. Circuit 6 consists of a comparator 10 and a register 11. The amplitude $A_i$ is transferred to register 11 only when comparator 10 has established that the value of $A_i$ is greater than the amplitude already contained in register 11. A range count pulse RP ensures that for each FFT scan and each range quant the maximum amplitude in register 11 is established and retained until the determination of the maximum amplitude for the following range quant from the FFT scan. The maximum amplitude AM is supplied to the PROM 7. In this memory the permissible number of frequency output signals exceeding the threshold values of the relevant frequency output channels at a given maximum amplitude is fixed in order that the target returns may be classified, in the first instance, as first trip echoes. The spectrum of coherently detected first trip echoes will in principle extend over a limited number of frequency output channels, while the spectrum of the multiple trip echoes is arbitrary from FFT scan to FFT scan and extends over a large number of frequency output channels. The number of frequency output channels, where the output signals exceed the corresponding threshold values, are counted in counter 8. If the count of counter 8 is equal to or smaller than the value read out of PROM 7, the target return received in the particular radar cell is classified, in the first instance, as a first trip echo, and the comparator 9 delivers the cell classification signal $\overline{CLASS}$ (=0). If the count of counter 8 is greater than the value read out of PROM 7, the target return is classified, in the first instance, as a multiple trip echo, and the comparator 9 delivers the $\overline{CLASS}$ (=1) cell classification signal. Thus the spectrum of the target return in each radar cell provides a preliminary indication of the target return being classifiable as a first trip or multiple trip signal. As already set forth in the introductory part of this description, a definite indication thereof is obtained after an averaging process of the preliminary indications over the cells of a cluster. The pulse radar apparatus of FIG. 1 is provided with a microprocessor 12, comprising:

a. means for combining the cells together covering one single target to form a cluster and for determining a signal representative of the target covered by the cluster;

b. means for deriving, from the cell classification signals of the cluster cells, a cluster classification signal CLUC, whose logical values indicate that the target returns within the cluster are classified as first trip and multiple trip signals; and c. means for reading the signal representative of the target covered by the cluster out of the microprocessor, in so far as the read-out signal is derived from target returns classified as first trip signals.

In order that the microprocessor be capable of performing the above functions, the following additional signals are required:

a. signal RG; this signal is indicative of the range of the radar cell from which the video data are processed in the cell classification unit;

b. signal FN; this signal is indicative of the number of the frequency output channel containing the maximum amplitude.

In the embodiment in question, the above additional signals are derived in the cell classification unit 5. Unit 5 comprises a channel counter 13, a range counter 14, and a channel-number register 15. The channel counter 13 is triggered with each FFT scan to count the number of frequency output channels of the FFT processing unit 3. After each count the range counter 14 is incremented. The channel counter 13 ensures that the number of the maximum amplitude at the instant determined by comparator 10 is entered in the channel-number register 15. The CLASS, RG and FN signals are supplied to microprocessor 12 via the microprocessor input circuit 16.

Figures 2A, 2B:
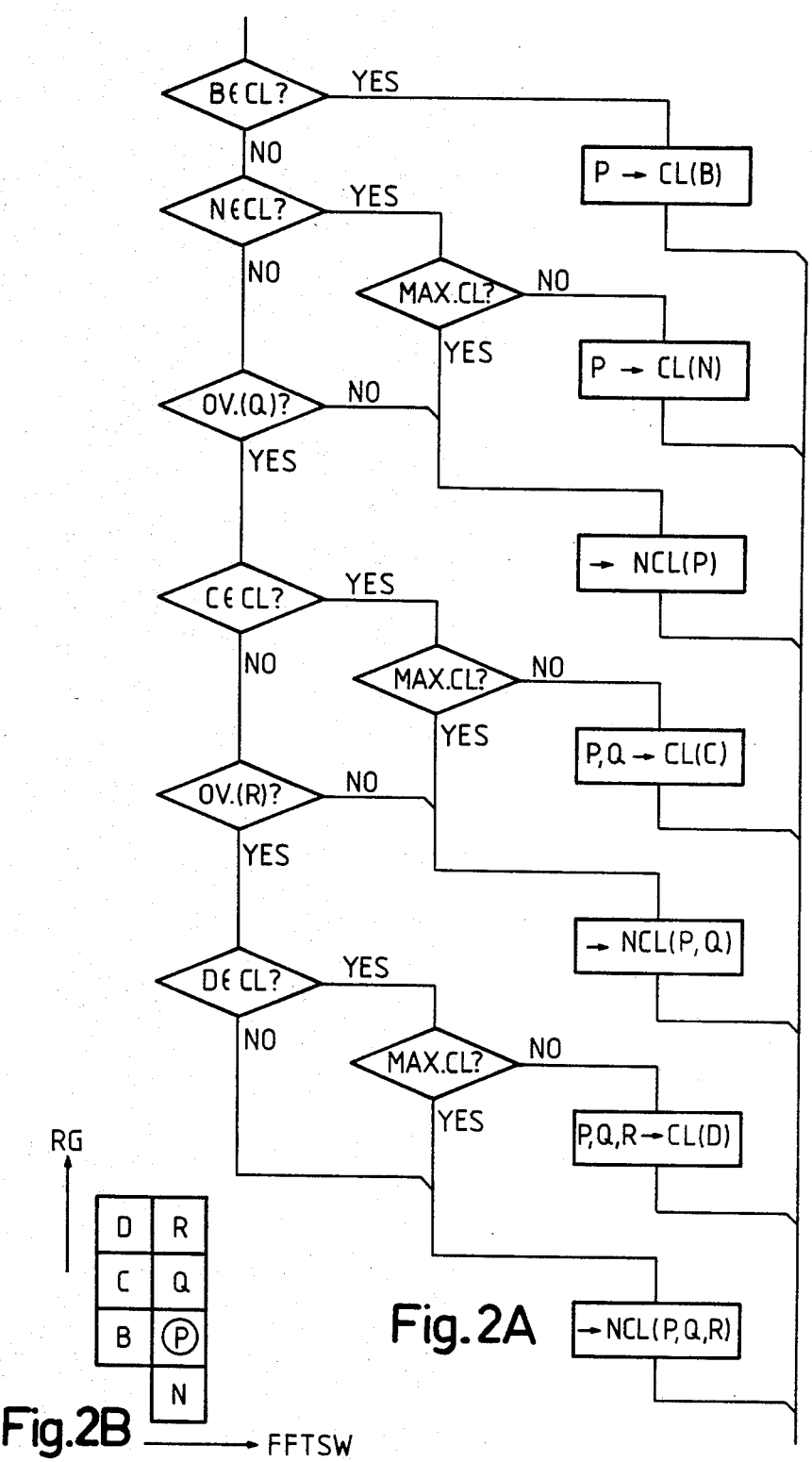
FIGS. 2A, 2B and 3 are diagrams explaining the functions fulfilled by the microprocessor.

The microprocessor first combines the cells together covering one single target to form a cluster and determines a signal representative of the target covered by the cluster. The computing process employed is illustrated in the flow diagram of FIG. 2A. The diagram of FIG. 2B explains the use of the flow diagram. FIG. 2B shows a number of radar cells B, C, D, N, P, Q and R for a number of successive range quants (RG) and FFT scans (FFTSW). In case of adjoining cells of excess amplitude in one or several frequency channels, these cells are combined to form clusters. If in an FFT scan no cells are added to a cluster or if the maximum cluster extent is reached, the cluster is isolated to perform the cluster classification. A cluster may extend over a certain maximum number of FFT scans, for example 7; if, after reaching the maximum width of a cluster, adjoining cells of excess amplitudes are detected, these cells must be added to a new cluster. Therefore, for each cluster the count of the FFT-scan counter must be updated, while the cluster is not to extend beyond a certain maximum number of range quants, for example 4. This is accomplished by counting the number of cells added during an FFT scan and storing this number of the preceding FFT scan. In building up a cluster, the data of the preceding and the current FFT scan is used. Suppose that in cell P in FIG. 2B an excess amplitude has occurred. If cell B belonged to a cluster (B$\epsilon$CL), then cell P is added to this cluster (P→CL(B)). If cell B did not belong to a cluster (B$\notin$CL), but cell N did (N$\epsilon$CL), cell P may be added to the cluster of N (P→CL(N)), provided the cluster has not reached its maximum range ($\overline{MAX.CL}$). If the cluster has reached the maximum value or if N did not belong to a cluster (N$\notin$CL) and no excess amplitude has been detected ($\overline{OV(Q)}$) in cell Q, a new cluster will be produced and will include cell P (→NCL(P)). If however an excess amplitude has occurred in cell Q (OV(Q)) and in cell C as well, cells P and Q are added to the cluster of C (P,Q→CL(C)), provided the cluster has not reached its maximum range ($\overline{MAX.CL}$). The process shown in the flow diagram continues until either cell P and possibly cell Q,R are added to an existing cluster (P→CL(B), P→CL(N), P,Q→CL(C) and P,Q,R→CL(D)), or new clusters are generated, of which P and possibly Q, R form a part (→NCL(P), →NCL(P,Q) and →NCL(P,Q,R)).

Amplitudes AM(i), where i=1, 2, . . . , k, of k cells belonging to the cluster thus produced are compared in the microprocessor; the maximum value counts as amplitude for the cluster AM(CL). This signal, which is representative of the target covered by the cluster, can be read out by the microprocessor, in so far as it is derived from target returns classified as first trip signals.

From the cell classification signals CLASS(i) of the cluster cells the microprocessor determines an average value $CLASS_{ave}$; from this value the cluster classification signal CLUC is derived. $CLASS_{ave}$ is expressed by:

$$CLASS_{ave} = \frac{\sum_{i=1}^{k} CLASS(i) \cdot AM(i)}{\sum_{i=1}^{k} AM(i)}.$$

Figure 3:
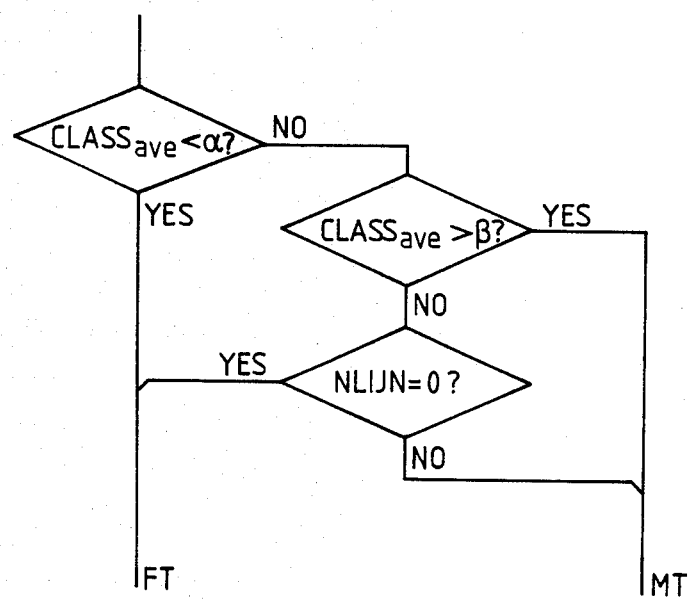

If the signal received in cell i is classified as a first trip echo, CLASS(i)=0; if it is classified as a multiple trip echo, CLASS(i)=1. In case in the majority of the cells the signal received therein is classified as first trip signal, the return of the target covered by the cluster is considered to be a first trip signal. Conversely, if in the majority of the cells the signals received therein are classified as multiple trip signals, the target return is classified as a multiple trip signal. Thus there are two constant values $\alpha$ and $\beta$, where $\alpha < \beta$; if $CLASS_{ave} < \alpha$, this is indicative of first trip echoes (FT); if $CLASS_{ave} > \beta$, this is an indication of multiple trip echoes (MT). If $\alpha < CLASS_{ave} < \beta$, a further criterion is to distinguish between first trip and multiple trip echoes. To this effect the microprocessor generates a signal NLIJN. If for all cell pairs from the cluster the amplitudes AM(i) are from the same or from two frequency-adjoining output channels of the FFT processing unit 3, signal NLIJN=0. If the cluster contains cell pairs, of which the amplitudes AM(i) are from different output channels but not adjoining in frequency, NLIJN=1. If $\alpha < CLASS_{ave} < \beta$ and NLIJN=0, the target returns will be classified as FT signals; if however NLIJN=1, the target returns will be classified as MT signals. The procedure here described is shown in the flow diagram of FIG. 3.

If $CLASS_{ave} < \alpha$, or, in case $\alpha < CLASS_{ave} < \beta$, NLIJN=0, CLUC=1 and the microprocessor will read out signal AM(CL) as belonging to a target return classified as first trip signal. In case $CLASS_{ave} > \beta$, or, in the event $\alpha < CLASS_{ave} < \beta$, NLIJN=1, then CLUC will be 0 and signal AM(CL), as belonging to a target return classified as an MT signal, will be suppressed, i.e. it will not be read out by the microprocessor.

We claim:

1. In a pulse radar apparatus comprising a transmitter for transmitting radar pulses, a receiver for detecting, sampling and digitizing target returns for a plurality of range quants, an n-point FFT processing unit coupled to the receiver and having n output channels for producing respective output signals $A_0, A_1 \ldots A_{n-1}$ representing the target returns for n successive radar scans, and a threshold circuit coupled to said output channels for passing the output signals having magnitudes larger than predefined threshold magnitudes for the respective channels, the improvement comprising means for distinguishing between first trip echoes and multiple trip echoes, including:

(a) a cell classification unit, coupled to the threshold circuit, for producing from the output signals passed a cell classification signal (CLASS) having successive logical values preliminarily indicating whether target returns from respective radar cells are first trip echoes or multiple trip echoes, said cell classification unit comprising:

(1) means for determining, for each cell, a value AM representing the maximum amplitude output signal for said cell, (2) a pre-programmed memory for responding to each value AM by indicating, for the respective cell, a predefined number of output signals which are permitted to have amplitudes larger than their respective threshold magnitudes, (3) a counter for determining for each cell the number of output signals having amplitudes larger than their respective threshold magnitudes, and (4) a comparator for comparing, for each cell, said predefined number of output signals with the actual number of output signals having amplitudes larger than their respective threshold magnitudes, said comparator effecting production of the cell classification signal (CLASS), said signal having a logical value representing a first trip echo only if the predefined number is equal to or larger than the actual number; and (b) a processor means, coupled to the cell classification unit, for:

(1) associating adjacent radar cells, which collectively cover a target, to form a cell cluster, (2) producing from the cell classification signals for said associated cells a cluster classification signal (CLUC) indicating whether the target returns for the cluster are first trip or multiple trip echoes, and (3) responding to the cluster classification signal (CLUC) by producing a signal representative of the target covered by the cluster, if the target returns for the cluster are first trip echoes.

2. A pulse radar apparatus as in claim 1 where said processor means comprises means for:

(a) determining from the values AM(i) for the respective cells in each cell cluster the maximum value AM(CL) for said cluster;

(b) determining from the values AM(i) for each cluster and from the cell classification signals CLASS(i) for the cells in each cluster, an average value:

$$CLASS_{ave} = \frac{\sum_{i=1}^{k} CLASS(i) \cdot AM(i)}{\sum_{i=1}^{k} AM(i)};$$

where k is the number of cells in the cluster;

(c) producing from the average value $CLASS_{ave}$ a cluster classification signal (CLUC) indicating that the target returns for the respective cluster are first trip echoes if $CLASS_{ave} < \alpha$, and indicating that said target returns are multiple trip echoes if $CLASS_{ave} > \beta$, where $\alpha$ and $\beta$ are predetermined values; and (d) producing an output signal representing the maximum value AM(CL) if the target returns for the respective cluster are first trip echoes.

3. A pulse radar apparatus as in claim 1 where said processor means comprises means for:

(a) determining from the values AM(i) for the respective cells in each cell cluster the maximum value AM(CL) for said cluster;

(b) determining from the values AM(i) for each cluster and from the cell classification signals CLASS(i) for the cells in each cluster, an average value:

$$CLASS_{ave} = \frac{\sum\limits_{i=1}^{k} CLASS(i)\, AM(i)}{\sum\limits_{i=1}^{k} AM(i)};$$

where k is the number of cells in the cluster;

(c) producing for each cell a cell reference signal NLIJN, when $\alpha < CLASS_{ave} < \beta$, said cell reference signal NLIJN having a first logical value if the maximum amplitude output signals for all cell pairs of the cluster are from the same FFT output channel or from two adjacent-frequency FFT output channels, and otherwise having a second logical value, said cluster classification signal (CLUC) indicating that the target returns for the respective cluster are first trip echoes if NLIJN has the first logical value, and indicating that said target returns are multiple trip echoes if NLIJN has second logical value; and (d) producing an output signal representing the maximum value AM(CL) if the target returns for the respective cluster are first trip echoes.

* * * * *